United States Patent
Davis et al.

(10) Patent No.: US 9,390,396 B2
(45) Date of Patent: Jul. 12, 2016

(54) BOOTSTRAPPING SOCIAL NETWORKS USING AUGMENTED PEER TO PEER DISTRIBUTIONS OF SOCIAL NETWORKING SERVICES

(75) Inventors: Marc E. Davis, San Francisco, CA (US); Stig Gustav Victor Söderström, Bromma (SE); Carl Olof Daniel Malmkvist, Stockholm (SE); Per Staffan Andreas Nordin, Stockholm (SE)

(73) Assignee: Excalibur IP, LLC, Sunnyvale, CA (US)

( * ) Notice: Subject to any disclaimer, the term of this patent is extended or adjusted under 35 U.S.C. 154(b) by 1195 days.

(21) Appl. No.: 11/866,601

(22) Filed: Oct. 3, 2007

(65) Prior Publication Data
US 2008/0134052 A1 Jun. 5, 2008

Related U.S. Application Data

(60) Provisional application No. 60/868,529, filed on Dec. 4, 2006.

(51) Int. Cl.
*G06F 15/16* (2006.01)
*G06F 3/00* (2006.01)
(Continued)

(52) U.S. Cl.
CPC .............. *G06Q 10/10* (2013.01); *H04L 12/585* (2013.01); *H04M 1/72525* (2013.01);
(Continued)

(58) Field of Classification Search
CPC ....... H04L 29/06; H04L 12/585; H04W 8/26; H04W 60/00; H04W 4/00; H04W 92/18; H04M 1/72552; H04M 1/72525; G06Q 10/10; G06Q 10/107
USPC ........... 709/204–206, 202, 207; 705/319, 14; 713/201; 455/410; 715/744, 733; 704/260
See application file for complete search history.

(56) References Cited

U.S. PATENT DOCUMENTS 5,493,692 A 2/1996 Theimer et al.
6,718,551 B1 4/2004 Swix et al.
(Continued)

FOREIGN PATENT DOCUMENTS

KR 1020020016436 3/2002
KR 1020040084541 10/2004
(Continued)

OTHER PUBLICATIONS

Kitterman, Scott; "How Web-Generated Emailers Can Avoid Looking Like Forgers"; Nov. 12, 2006; www.openspf.org; pp. 1-2; retrieved from http://www.openspf.org/?action=browse&id=Best_Practices/Webgenerated&revision=22 on Dec. 6, 2010.*
(Continued)

*Primary Examiner* — Oleg Survillo
*Assistant Examiner* — Schquita Goodwin
(74) *Attorney, Agent, or Firm* — James J. DeCarlo; Greenberg Traurig LLC (57) ABSTRACT

A mobile device, system, and method are directed towards enabling a social network member to bootstrap another person's membership to a social network application and to send an invite using an augmented peer to peer distribution mechanism. The member may bootstrap membership by providing information about the invitee. A server may then determine sharable social networking information, to include within the invite, such as personal information about the member, and/or about the invitee. The invite is then automatically modified to make it appear as though it is sent by the member, by spoofing an identifier of the source of the invite. A link or other information associated with a link to the sharable social network application may be automatically included into the invite, where the link is configured to direct the invitee to a configuration of the social network application appropriate for the invitee's mobile device.

20 Claims, 7 Drawing Sheets

(51) Int. Cl.

| | | |
|---|---|---|
| *G06Q 10/10* | (2012.01) | |
| *H04L 12/58* | (2006.01) | |
| *H04M 1/725* | (2006.01) | |
| *H04W 4/00* | (2009.01) | |
| *H04W 8/26* | (2009.01) | |
| *H04W 60/00* | (2009.01) | |
| *H04W 92/18* | (2009.01) | |

(52) U.S. Cl.
CPC ............ *H04M 1/72552* (2013.01); *H04W 4/00* (2013.01); *H04W 8/26* (2013.01); *H04W 60/00* (2013.01); *H04W 92/18* (2013.01)

(56) References Cited

U.S. PATENT DOCUMENTS

| | | | |
|---|---|---|---|
| 6,801,931 B1* | 10/2004 | Ramesh | G06Q 10/107 704/260 |
| 6,834,195 B2 | 12/2004 | Brandenberg et al. | |
| 7,072,941 B2 | 7/2006 | Griffin et al. | |
| 7,188,153 B2* | 3/2007 | Lunt et al. | 709/218 |
| 7,389,324 B2* | 6/2008 | Masonis et al. | 709/206 |
| 7,487,912 B2 | 2/2009 | Seifert et al. | |
| 7,643,831 B2 | 1/2010 | Wilson | |
| 7,685,631 B1* | 3/2010 | Paya et al. | 726/8 |
| 7,783,706 B1* | 8/2010 | Robinson | H04L 12/585 709/206 |
| 7,797,256 B2* | 9/2010 | Zuckerberg et al. | 705/319 |
| 8,176,131 B2* | 5/2012 | Masonis et al. | 709/206 |
| 2001/0013051 A1 | 8/2001 | Nakada et al. | |
| 2001/0032137 A1* | 10/2001 | Bennett et al. | 705/14 |
| 2001/0039191 A1 | 11/2001 | Maierhofer | |
| 2002/0023132 A1* | 2/2002 | Tornabene et al. | 709/205 |
| 2002/0129282 A1 | 9/2002 | Hopkins | |
| 2003/0050976 A1* | 3/2003 | Block et al. | 709/203 |
| 2003/0110234 A1* | 6/2003 | Egli et al. | 709/217 |
| 2003/0195937 A1* | 10/2003 | Kircher, Jr. | G06Q 10/107 709/207 |
| 2004/0064730 A1* | 4/2004 | Kamiyama et al. | 713/201 |
| 2005/0004837 A1* | 1/2005 | Sweeney et al. | 705/14 |
| 2005/0050143 A1 | 3/2005 | Gusler et al. | |
| 2005/0055409 A1* | 3/2005 | Alsarraf et al. | 709/206 |
| 2005/0149621 A1 | 7/2005 | Kirkland et al. | |
| 2005/0174975 A1 | 8/2005 | Mgrdechian et al. | |
| 2005/0176433 A1 | 8/2005 | Wilson | |
| 2005/0177750 A1* | 8/2005 | Gasparini et al. | 713/201 |
| 2005/0197846 A1* | 9/2005 | Pezaris et al. | 705/1 |
| 2005/0210106 A1* | 9/2005 | Cunningham | 709/206 |
| 2006/0031334 A1 | 2/2006 | Kim | |
| 2006/0031337 A1 | 2/2006 | Kim | |
| 2006/0085419 A1 | 4/2006 | Rosen | |
| 2006/0161599 A1 | 7/2006 | Rosen | |
| 2006/0248584 A1* | 11/2006 | Kelly et al. | 726/18 |
| 2007/0143407 A1* | 6/2007 | Avritch et al. | 709/206 |
| 2007/0260523 A1* | 11/2007 | Schadt et al. | 705/14 |
| 2008/0046976 A1* | 2/2008 | Zuckerberg | 726/4 |
| 2008/0077595 A1* | 3/2008 | Leebow | 707/10 |
| 2009/0305667 A1* | 12/2009 | Schultz | 455/410 |
| 2011/0289153 A1* | 11/2011 | Hull et al. | 709/205 |
| 2012/0191797 A1* | 7/2012 | Masonis et al. | 709/206 |

FOREIGN PATENT DOCUMENTS

| | | |
|---|---|---|
| TW | 200300894 A | 6/2003 |
| TW | 200427273 A | 12/2004 |
| WO | WO-2005/069166 A1 | 7/2005 |
| WO | WO-2005/114970 A2 | 12/2005 |
| WO | 2008106306 A1 | 9/2008 |

OTHER PUBLICATIONS

SearchSecurity; "Email Spoofing"; Jul. 22, 2002; SearchSecurity.com; pp. 1-2.*
WikiHow, "How to Use Constrained Writing to Send a Secret Message," retrieved via: http://www.wikihow.com/Use-Constrained-Writing-to-Send-a-Secret-Message.*
Nancy Feigenbaum, "How Marketing Companies Disguise Junk Mail Government-check and Overnight-mail Lookalike Envelopes Losing Effectiveness," Oct. 1, 1989, The Sentinel Staff, retrieved via: http://articles.orlandosentinel.com/1989-10-01/business/8909293528_1_postal-envelope-rv-resort.*
GreenDimes.com, "History of Junk Mail," Retrieved on Sep. 15, 2015 via URL: http://www.greendimes.com/history-of-junk-mail-as-told-by-green-dimes/.*
Federated search, http://en.wikipeda.org/wiki/Federated_search (last visited May 15, 2007) (3 pages).
Crowley, Dennis P. et al., U.S. Appl. No. 60/570,410, filed May 12, 2004 entitled "Location-Based Social Software for Mobile Devices", (18 pages).
International Search Report and Written Opinion for International Patent Application No. PCT/US2008/053597 mailed Aug. 5, 2008.
International Preliminary Report on Patentability for International Patent Application No. PCT/US2008/053597 mailed Sep. 11, 2009.
Official Communication for Taiwanese Patent Application No. 097105714 mailed Jan. 10, 2012.
Official Communication in U.S. Appl. No. 11/924,074 mailed Aug. 16, 2012.
Official Communication in U.S. Appl. No. 11/924,074 mailed Mar. 29, 2012.
Official Communication in U.S. Appl. No. 11/924,074 mailed Aug. 11, 2011.
Official Communication in U.S. Appl. No. 11/924,074 mailed Feb. 28, 2011.
Official Communication in U.S. Appl. No. 11/924,074 mailed Sep. 16, 2010.

* cited by examiner

BOOTSTRAPPING SOCIAL NETWORKS USING AUGMENTED PEER TO PEER DISTRIBUTIONS OF SOCIAL NETWORKING SERVICES

CROSS-REFERENCE

This utility patent application claims priority to U.S. Provisional Pat. application No. 60/868,529 filed on Dec. 4, 2006, the benefit of which is claimed under 35 U.S.C. §119, and is further incorporated herein by reference.

TECHNICAL FIELD

The present invention relates generally to mobile communications and, more particularly, but not exclusively to bootstrapping of a social network application by enabling a social network member to pre-register and invite others to participate in the application by using an augmented peer to peer distribution.

BACKGROUND

Tremendous changes have been occurring in the Internet that influence our everyday lives. For example, online social networks have become the new meeting grounds. They have been called the new power lunch tables and new golf courses for business life in the U.S. Moreover, many people are using such online social networks to reconnect themselves to their friends, their neighborhood, their community, and the world.

The development of such online social networks touch countless aspects of our everyday lives, providing instant access to people of similar mindsets, and enabling us to form partnerships with more people in more ways than ever before.

However, as social networking transforms our lives, many businesses continue to struggle to keep up, and provide value to the consumer in such a structure. For example, some people may be hesitant to visit and/or sign up to a social network service. This may especially be true, where the social network service is presented to the person, through an un-solicited communications, such as an advertisement, from a stranger, or the like. Such communications might not be trusted by the recipient. The recipient may therefore, select to discard the un-solicited message. The result is that the business may lose an opportunity to extend value to a consumer's online experience or to grow a consumer base. Moreover, a potential consumer may also lose an opportunity to expand their social networking relationships and experiences. Even where the communications does come from a friend, or other trusted source, the communications may provide limited assistance in joining the proposed social networking service. Often, the communications merely provides a link to a social network service that may be incompatible with the recipient's mobile device. Thus, many businesses are searching for new ways to integrate and improve social networking features that appeal to the consumer, while making a profit. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "social network" and "social community" refer to a concept that an individual's personal network of friends, family colleagues, coworkers, and the subsequent connections within those networks, can be utilized to find more relevant connections for a variety of activities, including, but not limited to dating, job networking, service referrals, content sharing, like-minded individuals, activity partners, or the like.

An online social network typically comprises a person's set of direct and/or indirect personal relationships, including real and virtual privileges and permissions that users may associate with these people. Direct personal relationships usually include relationships with people the user can communicated with directly, including family members, friends, colleagues, coworkers, and other people with which the person has had some form of direct contact, such as contact in person, by telephone, by email, by instant message, by letter, or the like. These direct personal relationships are sometimes referred to as first-degree relationships. First-degree relationships can have varying degrees of closeness, trust, and other characteristics.

Indirect personal relationships typically include relationships through first-degree relationships to people with whom a person has not had some form of direct or limited direct contact, such as in being cc'd on an e-mail message, or the like. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree relationship. Similarly, a friend of a friend of a friend can be characterized as three degrees of separation or a third-degree relationship.

The terms "social networking information," and "social network information," refer to both dynamic as well as less dynamic characteristics of a social network. Social networking information includes various profile information about a member, including, but not limited to the member's avatar, contact information, member's name, alias, or other identifier, the member's preferences, degrees of separation between the member and another member, a membership in an activity, group, or the like.

Social networking information further may include various information about communications between the member and other members in the social network, including, but not limited to emails, SMS messages, IM messages, Multimedia Message (MMS) messages, alerts, audio messages, phone calls, either received or sent by the member, or the like. Thus, in one embodiment, the social networking information may include lists of friends, family, co-workers, or the like. Such lists may be stored using any of a variety of mechanisms, including, but not limited to buddy lists, IM lists, address books, or the like. However, social networking information may also include information about a member's behavior online. Such behavioral social network information can include but is not limited to a frequency of visiting a web sites, types of online purchases, types of online communication used most often, duration of participating in online activities, and other information that can be detected about a user's online actions. Social networking information can also include user-defined information such as preferences, survey responses, traits or other features identified by the member, or the like.

Briefly stated the present invention is directed towards enabling a member of a sharable social network application to bootstrap another person's membership to the social network application and to send an invite using an augmented peer to peer distribution mechanism. The member may bootstrap membership using a variety of mechanisms. For example, the member may, select an icon, pop-up, or similar invite mechanism, within the sharable social network application. The invite mechanism enables the member to enter information about the other person, including a network address, identifier, or the like. A server may then determine sharable social networking information, with which to augment the invite. In one embodiment, the member may also select and provide at least some of the sharable social networking information. Such sharable social networking information may include personal information about the member, about the invitee, or even about both the member and the invitee. Inclusion of sharable social networking information is directed towards both providing potentially interesting information to the invitee, as well as attempting to ameliorate concerns that the invite is SPAM, or a similar message.

The invite may then be augmented automatically by the server to make it appear as though it is sent by the member, rather than the server. In one embodiment, a header, a short code, or other message source identifier in the invite is spoofed using the member's address or other identifier. Thus, the invite appears to be from one peer to another peer over a network, rather than from a distribution service, an advertiser, or the like. Spoofing the source identifier of the message is directed towards minimizing a likelihood that the invite is interpreted as SPAM, or other undesirable message. In another embodiment, a link or other information associated with an address to the sharable social network application is automatically included into the augmented invite by the server. In one embodiment, the link is configured such that the invitee may automatically access a configuration of the social network application useable by the invitee's mobile device, rather than searching for and/or proactively selecting an appropriate configuration.

It should be noted that while various embodiments below describe sharing of a sharable social network application, the invention is not constrained to merely applications. Other types of digital objects may also be distributed using the invention, including, for example, photographs, audio files, profiles, buddy lists, address books, game data, video files, or the like, without departing from the scope of the invention.

Illustrative Operating Environment

Figure 1:
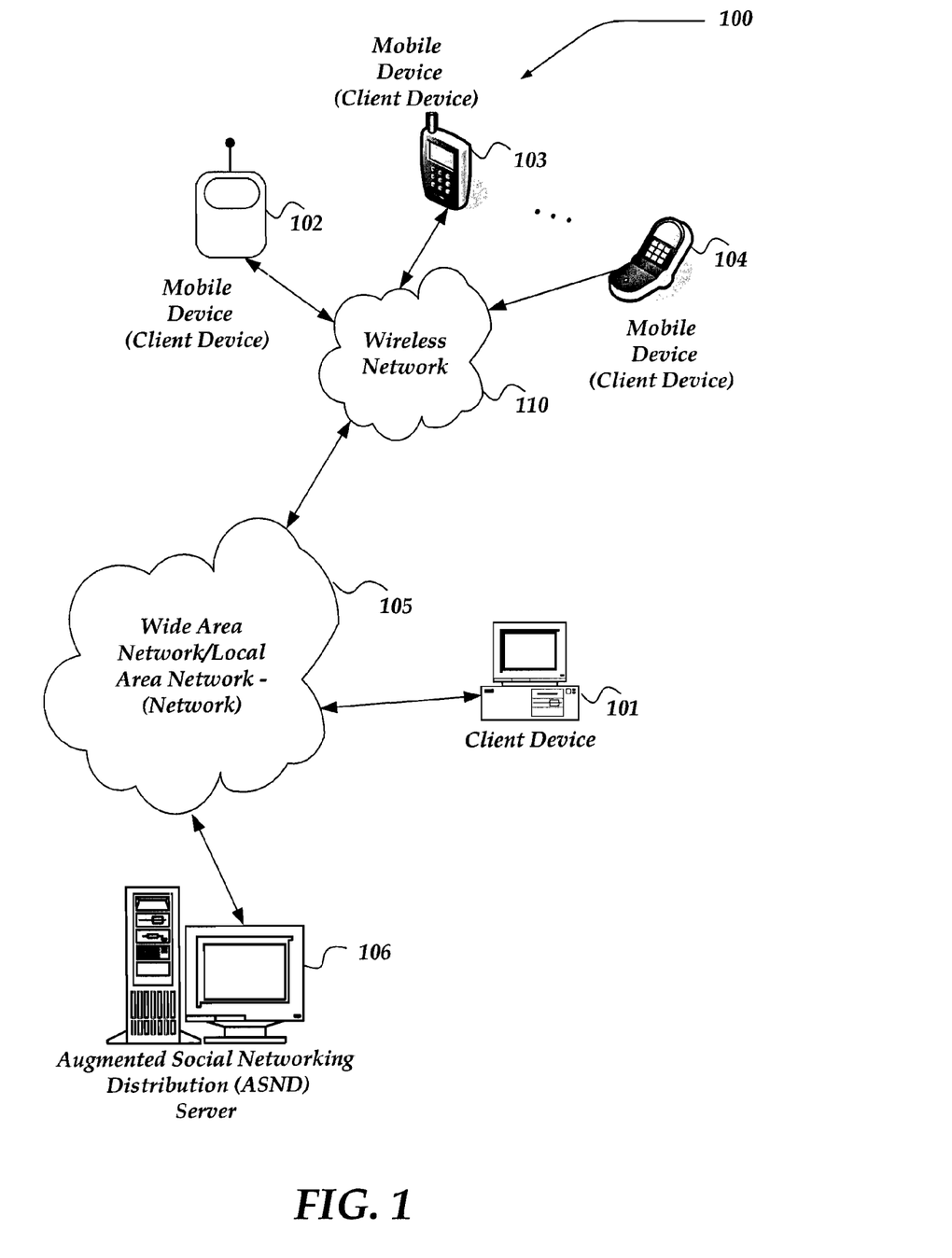
FIG. 1. is a system diagram of one embodiment of an environment in which the invention may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, Augmented Social Networking Distribution (ASND) server 106, mobile devices (client devices) 102-104, and client device 101.

One embodiment of mobile devices 102-104 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one other client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, a Mobile Subscriber Integrated Services Digital Network (MS-ISDN), Mobile Identification Number (MIN), an electronic serial number (ESN), or other mobile device identifier. The information may also indicate a content format that the mobile device is enabled to employ, as well as other configuration aspects and/or capabilities of mobile devices 102-104.

Capabilities of mobile devices 102-104 may be obtained through a mobile device's user agent profile, such as that defined by the User Agent Profile Specification available from the Open Mobile Alliance (OMA). Another example of an information source for use in determining a mobile device's configuration and capability includes Composite Capability/Preference Profiles (CC/PP), defined by the World Wide Web Consortium. Further examples of profiles describing mobile device capabilities that may be employed include a mobile information device profile (MIDP), a wireless universal resource file (WURFL), and the like. User agent profiles or other similar standardized profiles generally include attributes of a mobile device, such as a screen size, a screen resolution, a memory size, and the like. Mobile device user agents may also provide information such as which applications and version of the application may reside on a mobile device. Such information may be provided in a message, or the like, sent to ASND server 106, client device 101, or other computing devices. In one embodiment, the information may be provided upon request from the other computing device. However, the information may also be provided at a beginning of a communication with the other computing device, periodically during the communication, and/or based on some other event.

Mobile devices 102-104 may also be configured to communicate a message, such as through Short Message Service (SMS), Multimedia Message Service (MMS), instant messaging (IM), internet relay chat (IRC), Jabber, and the like, between another computing device, such as ASND server 106, client device 101, or the like. However, the present invention is not limited to these message protocols, and virtually any other message protocol may be employed.

Mobile devices 102-104 may be further configured to enable a user to participate in communications sessions, such as IM sessions. As such, mobile devices 102-104 may include a client application that is configured to manage various actions on behalf of the client device. For example, the client application may enable a user to interact with the browser application, email application, IM applications, SMS application, and the like.

Mobile devices 102-104 may further be configured to include a client application that enables the end-user to log into an end-user account that may be managed by another computing device. Such end-user account, for example, may be configured to enable the end-user to receive emails, send/receive IM messages, SMS messages, access selected web pages, participate in a social networking activity, or the like. However, participation in various social networking activities may also be performed without logging into the end-user account.

Mobile devices 102-104 may also communicate with non-mobile client devices, such as client device 101, or the like. In one embodiment, such communications may include participation in social networking activities, including sharing of photographs, sending/receiving of messages, providing information based on physical proximity between members, or similar social networking activities.

Client device 101 may include virtually any computing device capable of communicating over a network to send and receive information, including social networking information, or the like. The set of such devices may include devices that typically connect using a wired or wireless communications medium such as personal computers, multiprocessor systems, microprocessor-based or programmable consumer electronics, network PCs, or the like.

Wireless network 10 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102-104 and another computing device, network, and the like.

Network 105 is configured to couple ASND server 106 and its components with other computing devices, including client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (IS-DNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between ASND server 106, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of ASND server 106 is described in more detail below in conjunction with FIG. 3. Briefly, however, ASND server 106 may include any computing device capable of connecting to network 105 to enable a member of a social network application to bootstrap membership to the social network application, and send an augmented invite message to an invitee. Augmented invite messages may include sharable social networking information about the member, and/or the invitee that is automatically determined by ASND server 106. ASND server 106 may determine the sharable social networking information based on a behavior of the member and/or the invitee as they communicate with others over networks 110 and/or 105. The sharable social networking information may also be determined based on degrees of separation between other members within the social network application, as well as a variety of other activities, and/or data sources.

In one embodiment, ASND server 106 may also provide access to one or more sharable social network applications. Sharable social network applications may range from IM type of applications, to browser based applications, or any of a variety of other applications. For example, sharable social network applications may provide an integrated interface to a variety of back-end applications, including photo sharing applications, messaging applications, video sharing applications, audio sharing applications, blog applications, calendar sharing applications, or the like.

ASND server 106 may further be configured to spoof a source address of the augmented invite message to make it appear as though it is sent by the member rather than ASND server 106. In one embodiment, spoofing may be performed by replacing a short code, or similar source address with an identifier associated with the member, including such as a phone number, a member name, alias, nick-name, a mobile device identifier, or the like.

In one embodiment, ASND server 106 may embed in the augmented invite message a link, or other information useable by the invitee, to access a version of the social network application that is configured to be useable by the invitee's computing device. In one embodiment, ASND server 106 may determine which version based on an initial interaction with the invitee's computing device to request information about the computing device. In another embodiment, ASND server 106 may dynamically modify the link, or the like, in the augmented invite message after the invitee's computing device is notified of an available message.

Devices that may operate as ASND server 106 include personal computers desktop computers, multiprocessor systems, microprocessor-based or programmable consumer electronics, network PCs, servers, and the like.

Although FIG. 1 illustrates ASND server 106 as a single computing device, the invention is not so limited. For example, one or more functions of ASND server 106 may be distributed across one or more distinct computing devices. For example, sharable social network applications, determining sharable social network information, and/or generating of augmented invite messages, or the like, may be performed by a plurality of computing devices, without departing from the scope or spirit of the present invention.

Illustrative Mobile Client Environment

Figure 2:
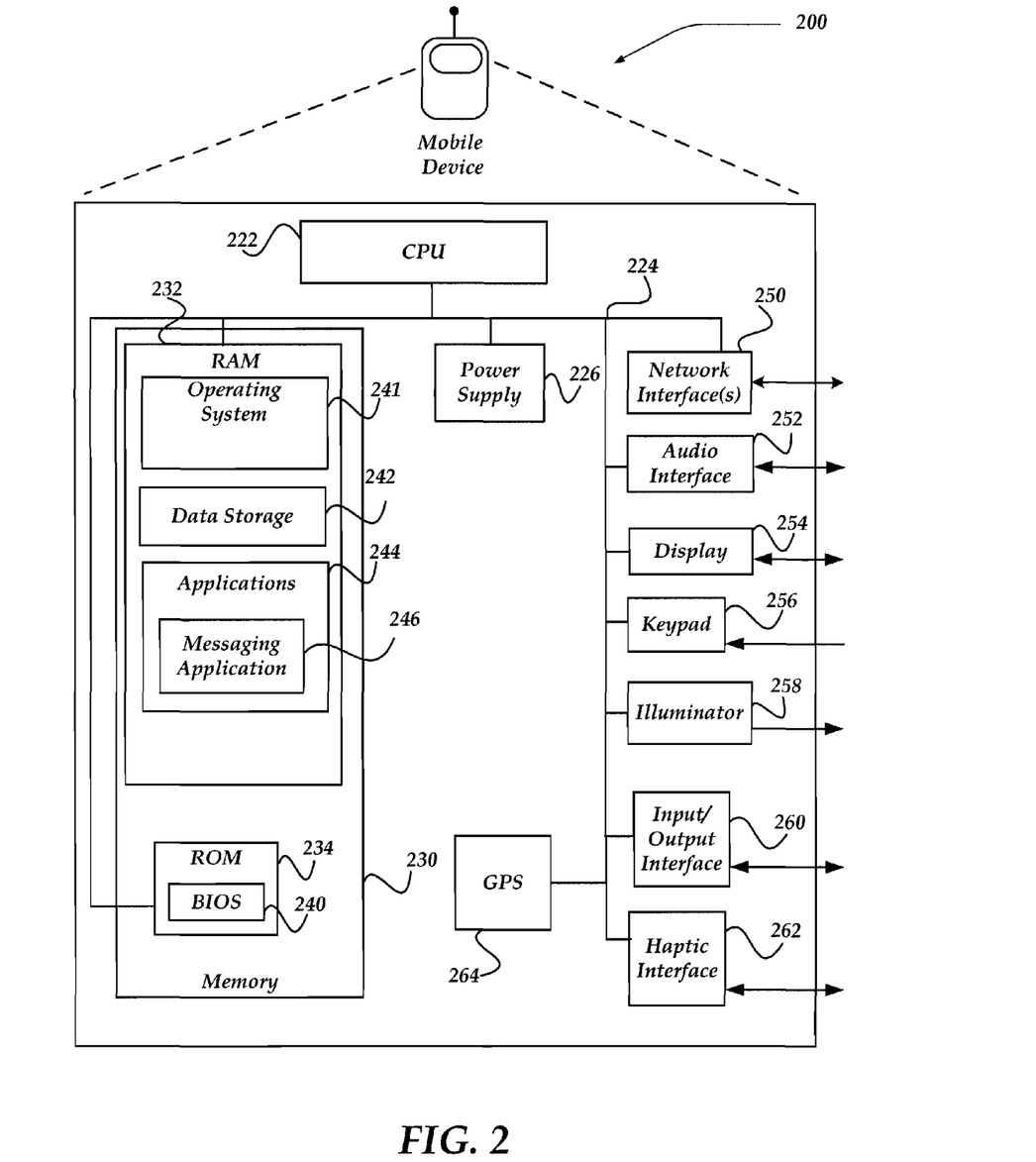
FIG. 2. shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 242, which can be utilized by mobile device 200 to store, among other things, applications 244 and/or other data. For example, data storage 242 may also be employed to store information that describes various capabilities of mobile device 200. The information may then be provided to another device based on any of a variety of events, including being sent as part of a header during a communication, sent upon request, or the like. Moreover, data storage 242 may also be employed to store social networking information, including various social network buddy lists, address books, or the like. At least a portion of the social networking information may also be stored on a disk drive or other storage medium (not shown) within mobile device 200.

Applications 244 may include computer executable instructions which, when executed by mobile device 200, transmit, receive, and/or otherwise process messages, audio, video, and enable telecommunication with another user of another mobile device. Other examples of application programs include calendars, contact managers, task managers, transcoders, database programs, word processing programs, spreadsheet programs, games, and so forth. In addition, applications 244 may include any of a variety of messaging applications 246, including, but not limited to SMS, MMS, IM, email, browsers, or the like. In one embodiment, messaging applications 246 may also include various social network applications, including those described above, as well as stubs, scripts, applets, and/or interfaces to a variety of social network applications that may be hosted on another computing device, such as ASND server 106 of FIG. 1, or the like.

Illustrative Server Environment

Figure 3:
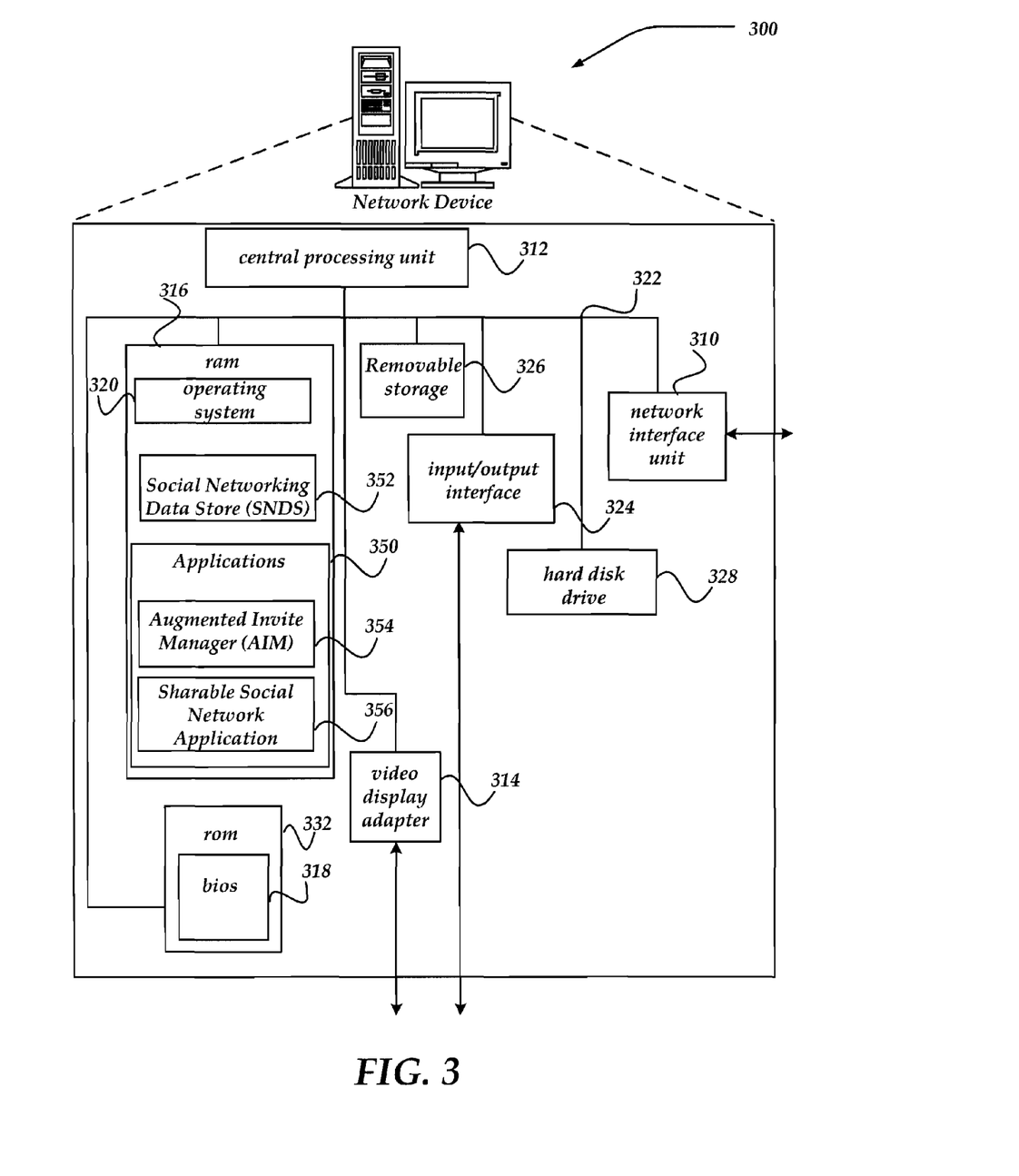
FIG. 3. shows one embodiment of a network device that may be included in a system implementing the invention.

FIG. 3. shows one embodiment of a network device, according to one embodiment of the invention. Network device 300 may include many more components than those shown. The components shown, however, are sufficient to disclose an illustrative embodiment for practicing the invention. Network device 300 may represent, for example, ASND server 106 of FIG. 1.

Network device 300 includes processing unit 312, video display adapter 314, input/output interface 324, and a mass memory, all in communication with each other via bus 322. The mass memory generally includes RAM 316, ROM 332, and one or more mass storage devices, such as hard disk drive 328, and removable storage 326, including a tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, account management, and so forth. Sharable social network applications 356 and Augment Invite Manager (AIM) 354 may also be included as an application program within applications 350.

Sharable social network applications 356 include any of a variety of server side social network applications including, but not limited to photo sharing applications, video and/or audio sharing applications, messaging applications, dating applications, blogging applications, gaming applications, or the like. In one embodiment, sharable social network applications 356 may be accessible through a client application that resides on a client device, such as mobile devices 102-104, and/or client device 101 of FIG. 1, or the like. In one embodiment, at least a portion of sharable social network applications 356, such as a client interface module, or the like may be downloaded to the client device. In one embodiment, the downloaded portion may be configured based on a configuration of the client device. For example, where the client device is web enabled, the downloaded portion may include plug-ins, scripts, applets, or the like with a web browser, or other web application interface. Similarly, where the client device is memory constrained, or the like, the downloaded portion may be configured to reside within such constraints. Determination of a client device's configuration may be based, in one embodiment, on a communication with the client device. In one embodiment, a selection of which downloadable portion to provide to the client device may be determined dynamically when the client device initially communicates with network device 300. In another embodiment, the client device's configuration may be determined based on information about the client device obtainable from Social Networking Data Store (SNDS) 352, which may be implemented as a database, a folder, program, or the like.

SNDS 352 may also include a variety of other social networking information, including information collected about a social networking member's network activities. Such networking activities may include which websites a member may visit, with whom the member may communicate with, what purchases a member may make over the network, or the like. SNDS 352 may also include various membership lists, obtainable from a variety of sources including buddy lists, address books, or the like. SNDS 352 may also include information about a type, configuration, and/or capability of client device that the member may use. SNDS 352 may also include address information for a member, and/or other related information about the member, including any nick-names, aliases, or the like associated with the member. Such social networking information may be obtained during a registration of a member to a sharable social network application, registration to obtain a user account, or the like. In one embodiment, the social networking information may also be obtained by monitoring activities of the members by the sharable social network application 356, and/or by a variety of other applications.

AIM 354 is configured to enable a member to bootstrap registration of a potential member to a sharable social network application 356, and to provide an augmented invite to the recipient (invitee). AIM 354 may, in one embodiment, interact with sharable social network application 356 to provide a selectable icon, menu, pop-up, or the like, that the member may select to invite the invitee. In one embodiment, the selectable icon or the like may be integrated with the sharable social network application 356's client interface.

AIM 354 may receive information about the invitee from the member and/or perform a search within SNDS 352 to determine available information about the invitee, the invitee's client device, friends in common between the member and the invitee, members that may be of interest to meet by the invitee, or the like.

AIM 354 may, in one embodiment, receive a request to provide an invite from sharable social network application 356, from a client application on the member's computing device, or the like. In any event, AIM 354 may augment the invite by: modifying a source identifier so that the invite appears to be sent by the inviting member rather than by network device 300; embedding a link or other information to enable the invitee to access the sharable social network application, where the link or other information is to a configuration of the sharable social network application useable by the invitee's computing device; and/or including sharable social networking information about the invitee and/or the member.

AIM 354 may then send the augmented invite message to the invitee using any of a variety of communication mechanisms, including, but not limited to SMS, SMS+, XML, RSS, IRC Chat, email, IM, MMS, Bluetooth file transfer, voice within audio insertions, or the like. In one embodiment, AIM 354 may configure the augmented invite message such that a first portion of the message may be transmitted using a first communication mechanism, while another portion may be transmitted using a second communication mechanism. A link or other interface may be employed to enable access to the other portion of the augmented invite message. Such configuration may be employed for example, by sending the first portion using SMS, or the like, and the other portions using, for example, MMS, HTTP, or the like. AIM 354 may employ a process such as described below in conjunction with FIG. 4 to perform at least some of its actions.

Generalized Operation

Figure 4:
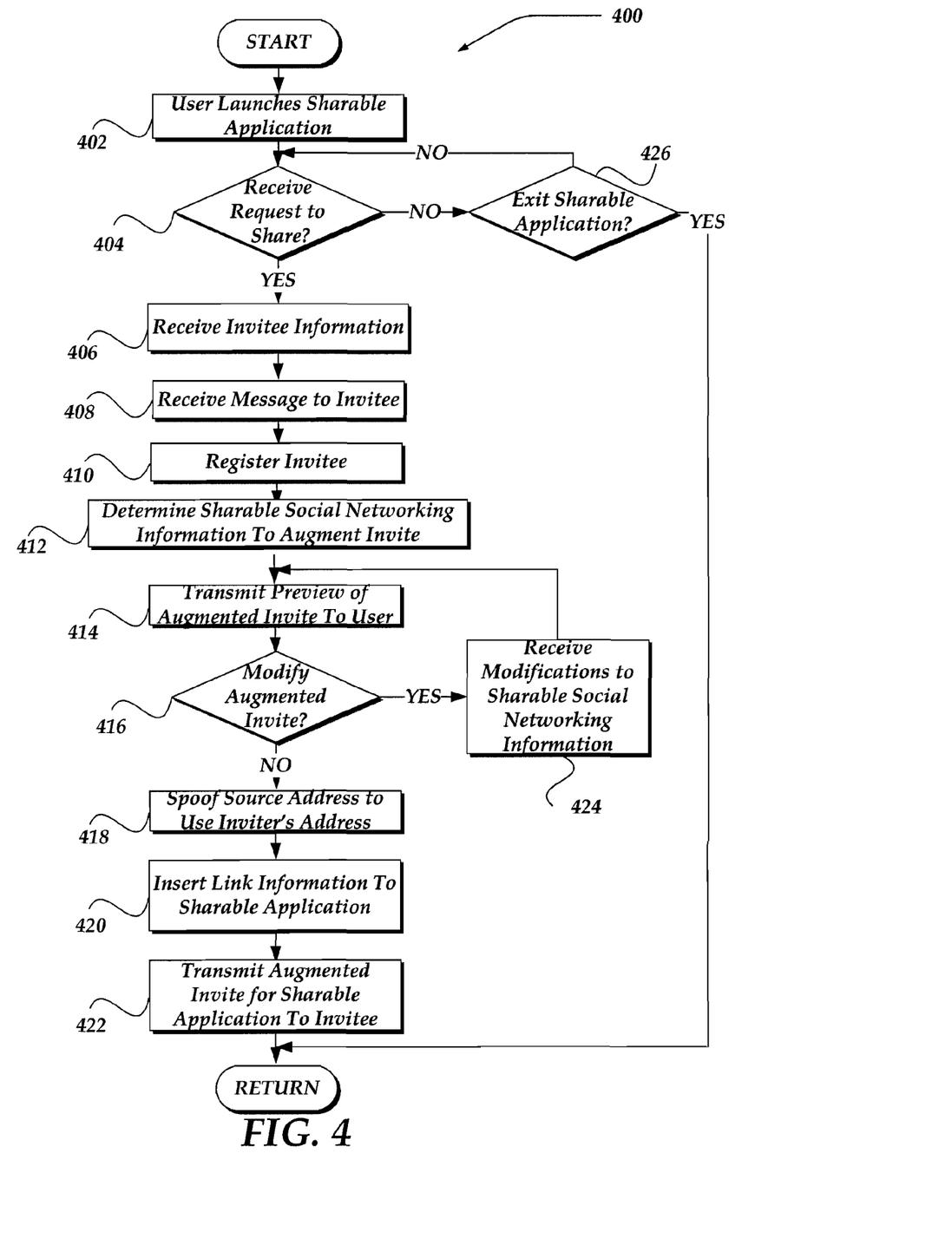
FIG. 4. illustrates a logical flow diagram generally showing one embodiment of a process for enabling augmented peer to peer social network application distributions with membership bootstrapping.

The operation of certain aspects of the invention will now be described with respect to FIG. 4. Process 400 of FIG. 4 may be performed, for example, by various components of ASND server 106 of FIG. 1. As shown in the figure, process 400 begins, after a start block, at block 402, where a member of a social network selects to launch a sharable social network application. The member may then select to initiate an invite to share the sharable social network application, exit the application, or otherwise enjoy the sharable social network application. Thus, the process continues to decision block 404 to determine whether the member has initiated an invite to share. If so, processing flows next to block 406; otherwise, processing proceeds to decision block 426 to determine if the member has selected to exit the sharable social network application. If the member has selected to exit, processing then returns to a calling processing to perform other actions; otherwise, processing loops back to decision block 404.

It should be noted that while the process illustrates selecting to initiate an invite from within the sharable social network application, the invention is not so limited. For example, in one embodiment, the member may select to initiate the invite, from outside of the sharable social network application such as might be performed by a script, applet, or menu interface to an invite application, or the like.

In any event, at block 406, the member may enter information about the invitee, including a name, address, phone number, alias, and/or other information useable to identify the invitee. In one embodiment, the invitee may already be a member to a different sharable social network application. Thus, in that instance, at least some of the invitee's information may be available through a data store, or otherwise from the other sharable social network application. In one embodiment, at least some of the invitee's information that is available through the data store, or the like, may be used to provide confirmation to the member of the correct invitee.

Processing then continues to block 408, where in one embodiment the member may compose a brief invite message to the invitee—thereby personalizing the invite. Processing then flows to block 410, where the invitee may then be registered to use the sharable social network application.

Process 400 continues next to block 412, where sharable social networking information may be determined and used to augment the invite. Such sharable social networking information may include a variety of personally identifying information about the inviting member and/or about the invitee. The sharable social networking information may be obtained through a variety of mechanisms, including but not limited to, from the sharable social network application, from another sharable social network application, from activities between members, from activities of members over a network, or the like. In one embodiment, the member may also provide at least a portion of the sharable social networking information. The sharable social networking information is directed towards enhancing the invitee's perceived value of the sharable social network application, as well as minimizing a likelihood that the invitee interprets the invite message as SPAM, or other un-desirable message. Thus, examples of personally sharable social networking information may include, but are not limited to:

1. Representations of members of the inviting member's social network.
2. Representations of members of the inviting member's social network that are also known to be in the invitee's social network.
3. Personally identifying information about the inviting member and/or the invitee, such as a photograph, an audio clip, name, alias, gender, age, birth date, location of home or work, city of origin of one or both the inviting member and/or the invitee.
4. A current physical location of the inviting member and/or the invitee. Such information may be obtained using a geo-tracking mechanism within a client device, an IP address, or the like.
5. Information about the invitee, and/or the inviting member's distinguishing interests, traits, activities, or the like.
6. Information that might be known only, or nearly only, to both the invitee and the inviting member, such as a name of a friend, family, pet; events both may participate in; locations both may have been at; or the like.

In any event, such information may then be included in the invite to augment the invite. The augmented invite may then be made available to the member to preview. Processing then flows to decision block 416, where the member may be permitted to modify the invite, including the message, information about the invitee, the sharable social networking information, or the like. If the member selects to modify the augmented invite processing branches to block 424, where the member's modifications are received. Processing then loops back to block 414 to provide a preview of the revised invite.

At decision block 416, if the member selects not to modify the augmented invite, processing continues to block 418, where the header or other source identifier for the augmented invite message is spoofed to make it appear as though the augmented invite is being sent directly from the member. Such spoofing makes the augmented invite appear to be between peer devices (client device to client device), rather than from the server. Spoofing of the source identifier may be performed using a variety of mechanisms. For example, where the augmented invite might be transmitted as an SMS message, rather than using a short code or other identifier to the server, the displayed message to the invitee may be a name and/or phone number of the inviting member. However, the invention is not so limited, and other mechanisms may also be employed, including modifying a source IP address in a packet header, modifying content within the augmented invite message, or the like. In any event, spoofing of the source address is directed towards providing the invitee with recognizable message source information such that the invitee is less likely to interpret the invite message as SPAM, or the like.

Processing next moves to block 420, where link information to the sharable social network application may be automatically inserted into the augmented invite message. In one embodiment, the link information includes a URL, URI, or the like. In another embodiment, the link information may include instructions on how to access the sharable social network application. For example, the instructions could include a phone number to call, or the like. In one embodiment, the phone number could also be a selectable phone number that once selected automatically dials the number.

In one embodiment, the link information may be to a sharable social network application that is configured based on information about the invitee's computing device. Such information about the invitee's computing device may be obtained based on a variety of mechanisms, including, a prior communication with the invitee, information from a registration of the invitee to a different sharable social network application, or the like. In one embodiment, the link information may be dynamically modified after at least a first portion of the augmented invite message is received by the invitee. In any event, the link information is configured to enable the invitee to automatically obtain access to the sharable social network application configuration useable with the invitee's computing device.

In any event, processing then proceeds to block 422, where the augmented invite message is transmitted to the invitee. In one embodiment, the augmented invite may be transformed such that it may be transmitted using any of a variety of mechanisms, including, but not limited to SMS, SMS+, XML, RSS, IRC Chat, email, IM, MMS, or the like. Moreover, in one embodiment, the mechanism used to transmit the augmented invite may be selectable by the inviting member, automatically selected based on information about the capabilities of the invitee's computing device, or even predefined. In one embodiment, a first portion of the augmented invite may be communicated using a first communication mechanism, while another portion is communicated using a second communication mechanism, with at least the first portion having a link or the like, to a second portion of the augmented invite message. Process 400 then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Sharable Application Interface

Figure 5:
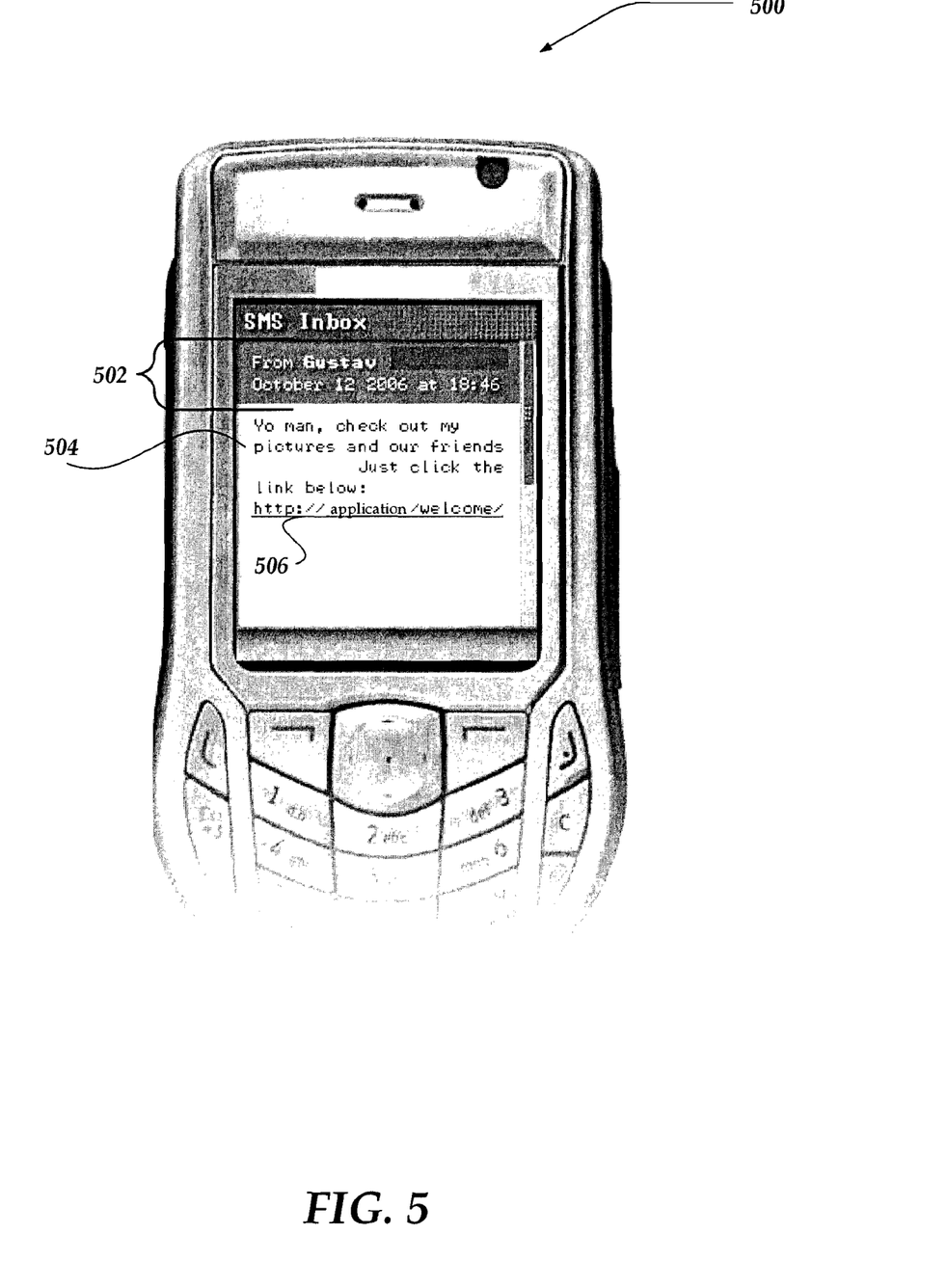
FIGS. 5-7. illustrate one embodiment of a use case illustrating bootstrapping membership to a social network application distributed using an augmented peer to peer mechanism, in accordance with the present invention.
Figure 6:
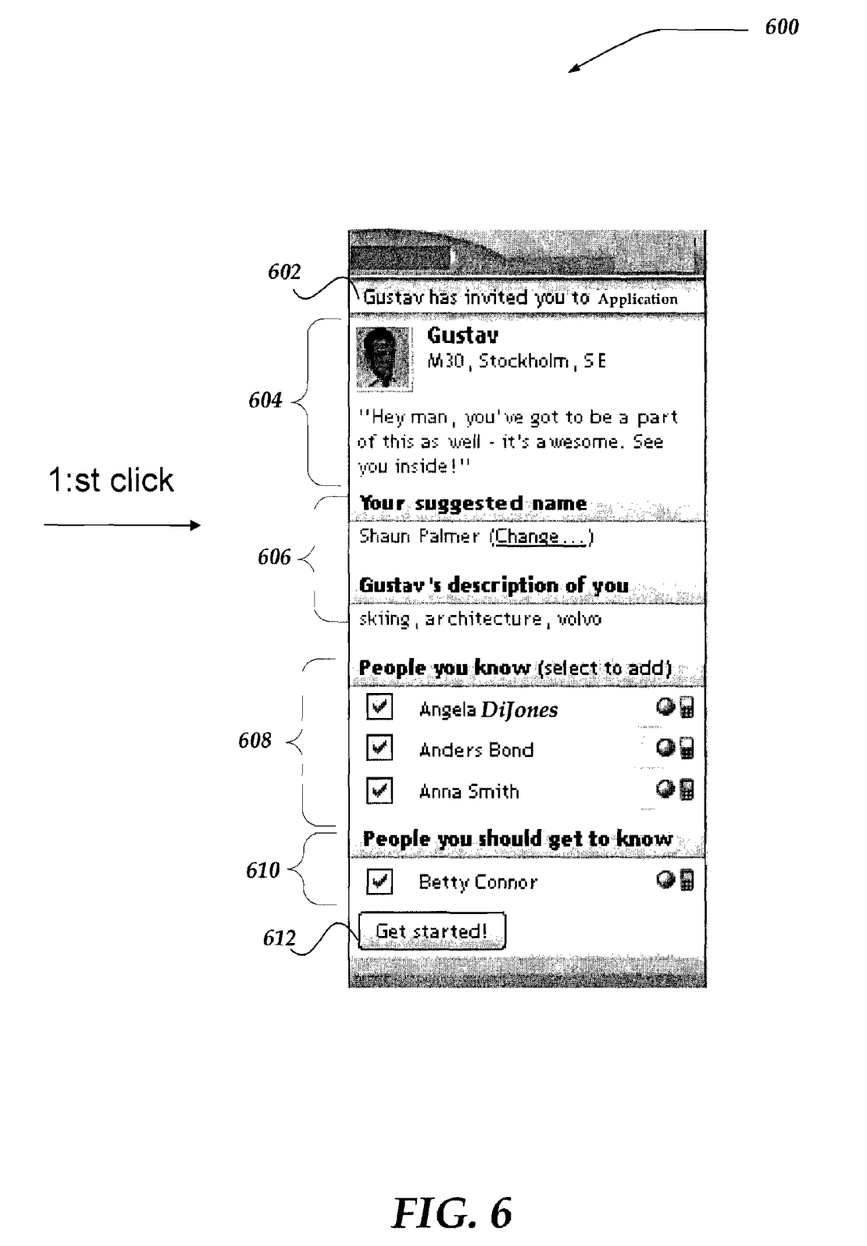
Figure 7:
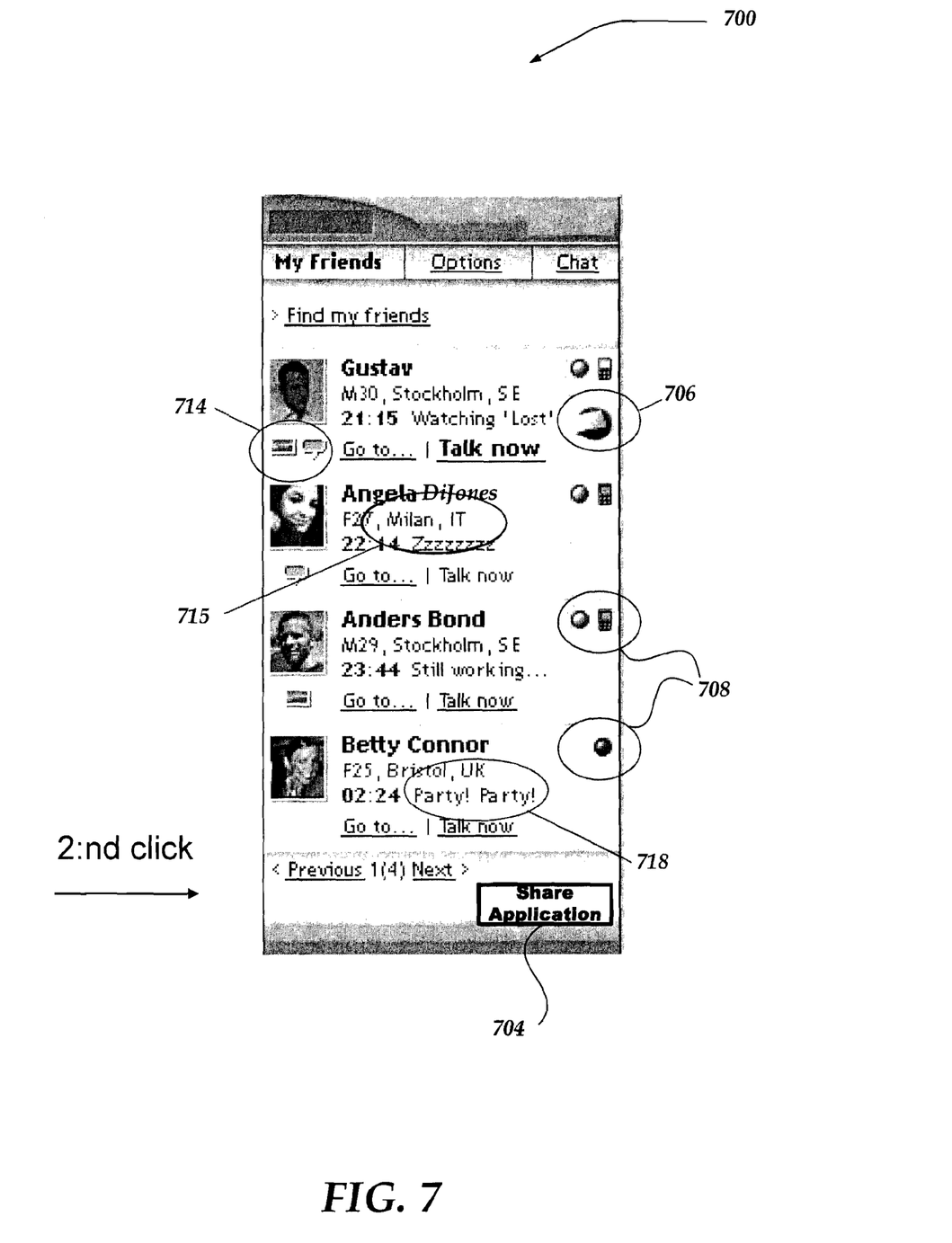

FIGS. 5-7 provide one embodiment of a use case of bootstrapping membership to a social network application that may be distributed using an augmented peer to peer mechanism. It should be noted that the following use case is but one of a variety of possible uses of the invention, and other digital objects, may also be distributed using the invention. Thus, the use case is not intended to limit the invention in any manner, but merely illustrate one example use.

Moreover, FIGS. 5-6 illustrate examples of augmented invite messages, while FIG. 7. illustrates an example of a sharable social network application. Thus, in one embodiment, where the mechanism for transmission provides a limited display of the invite, the invite message may comprise multiple invite message portions.

As shown in FIG. 5, a user of a client device, such as mobile device 500 may receive a message. In one embodiment, the message is received within an SMS inbox, however, the invention is not so constrained, and other mechanisms may be employed to receive and display the message. As shown, the message indicates (source identifier 502) that it is from someone that the recipient already knows, Gustav. In one embodiment, the sender, Gustav, may already be in the recipient's address book, buddy list, SMS list, or the like. Because the source identifier 502 indicates the message is from some known to the recipient, the recipient is likely to interpret the message is other than SPAM.

The message may further include information 504, such as text from the sender to further indicate that the message is other than SPAM. In another embodiment, information 504 may include a variety of personally identifying information about the inviting member and/or about the invitee, such as described above in conjunction with FIG. 4.

In one embodiment, the message may include link 506 that the recipient may employ to access a sharable social network application or other digital object. In one embodiment, however, the invite message may span multiple messages, or portions of messages. For example, in one embodiment, where a transmission mechanism may constrain an amount of viewable information, the link 506 may link to another portion of the invite message, or even an expanded version of the invite message.

Thus, as shown in FIG. 5, the invite message may be initially transmitted as an SMS message, displaying a link to an expanded, or other portion of the invite message, such as illustrated in FIG. 6.

Selection of the link 506 may, in another embodiment, however result in accessing the sharable social network application, where at least a portion of the sharable social network application is configured for the recipient's mobile device 500 may be downloaded to mobile device 500.

FIG. 6. illustrates one embodiment of a screen display 600 for another portion or an expansion of the invite message that may be displayed upon selection of link 506. As seen, screen display 600 may include personally identifying information, such as sender information 604 that may include a photograph, gender information, location information, or other information about the sender of the invite message. Screen display 600 may also include recipient information 606 that may include information known by the sender and recipient only, a nickname of the recipient, activities traits, or other personally identifying information about the recipient.

Screen display 600 may also include a variety of other personally identifying information including, for example, a list of people 608 that may be know to both the sender and the recipient, a list of people 610 known to the sender but perhaps not by the recipient, or the like. The invention, however, is not constrained to merely providing lists of people, and other personally identifying information may be displayed including such information as described above in conjunction with FIG. 4.

In addition, screen display 600 may include link information, such as a selectable icon 612 that enables access to access to the sharable social network application configured for the recipient's mobile device 500. Selection of selectable icon 612 may, in one embodiment, result in a download of a portion of the sharable social network application, such as a client interface, script, applet, or the like, that is configured based on the recipient's mobile device's capabilities and/or configuration.

Moreover, in one embodiment, selection of selectable icon 612 may also confirm registration of the recipient to the sharable social network application. For example, as described above, in one embodiment, the invention enables bootstrapping of membership to the sharable social network application by enabling another member to register the recipient. However, selection of the selectable icon 612 may confirm the registration, in one embodiment. Further, in one embodiment, failure to select selectable icon 612 by the recipient, might un-register the recipient. Failure to select, may be based, for example, on the recipient deleting the invite message, or the like, without selecting the selectable icon 612.

FIG. 7. illustrates one embodiment of an example of screen display 700 for a sharable social network application. It should be understood, that any of a variety of other sharable social network applications, or other digital objects may be implemented using the invention. Thus, FIG. 7. is not intended to limit or constrain the invention.

As shown in FIG. 7, screen display 700 may provide information about the sender, including profile information 714, online status information 706, or the like. Screen display 700 may also include information about various people, including location information 715, online status information 708, last presence information 718, photographs, comments on their profiles, or the like.

Also illustrated in screen display 700 is a share icon 704 that may enable the recipient to share the sharable network application with another person, such as described above.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method comprising:
providing a selectable user interface that enables a member of an electronic social network application to generate an electronic invite to a recipient;
receiving an identifier of the recipient of the electronic invite;
automatically augmenting the electronic invite with personally identifying information pertaining to the recipient, the identifying information comprising at least one item of information known only by a limited group of people prior to the electronic invite being generated, the limited group of people including the recipient and the member associated with the augmented electronic invite, wherein the identifying information is known from prior social interactions of the recipient and member;
automatically spoofing a source identifier of the augmented electronic invite to make the augmented electronic invite appear to be originating from the member rather than from a server device, the spoofing being implemented to minimize a likelihood that the augmented electronic invite is interpreted as spam;
transmitting a first portion of the augmented electronic invite to the recipient;
receiving a request from the recipient to access another portion of the augmented electronic invite;
determining a capability of a computing device associated with the request; and
transmitting a second portion of the augmented electronic invite to the recipient with link information to a version of the electronic social networking application configured to be compatible with the capability of the computing device.

2. The method of claim 1, further comprising:
registering the recipient as another member to the electronic social network application prior to transmitting the first portion of the augmented electronic invite to the recipient.

3. The method of claim 1, wherein automatically augmenting the electronic invite further comprises automatically augmenting the electronic invite with shareable social networking information that comprises at least one of information about a current location of the member, a current location of the recipient, information about a common friend known by both the member and the recipient, a graphical image of the member or a graphical image of the recipient.

4. The method of claim 1, automatically spoofing a source identifier further comprises automatically replacing at least one of a network address associated with the server device to at least one of a network address, a name, or an alias associated with the member.

5. A system comprising:
a processor;
an electronic social network application stored in a non-transitory storage medium that is configured for execution by the processor to perform actions, including:
transmitting, over an electronic communications network, a user interface to a computing device of a member of the electronic social network application, the transmitting causing the user interface to be displayed on a display at the member's computing device and enabling the member of the electronic social network application to generate an electronic invite to a recipient to participate in the electronic social network application; and an electronic augmented invite component stored in the non-transitory storage medium that is configured for execution by the processor to perform actions, including:
receiving an identifier of the recipient of the electronic invite from the member via the user interface and the electronic communications network;
registering the recipient as another member of the electronic social network application prior to transmitting the electronic invite to the recipient;
automatically augmenting the electronic invite by the augmented invite component with identifying information pertaining to the recipient to minimize a likelihood that the augmented electronic invite is interpreted as spam, the identifying information comprising at least one item of information about at least one of the member and the recipient known only by a limited group of people prior to the electronic invite being generated, the limited group of people including the recipient and the member associated with the augmented electronic invite, wherein the identifying information known only by a limited group of people prior to the electronic invite being generated is known from prior social interactions of the recipient and the member;
automatically spoofing a source identifier of the augmented electronic invite to make the augmented electronic invite appear to be originating from the member rather than from the augmented invite component, wherein the spoofing is performed in a manner that minimizes the likelihood that the augmented electronic invite is interpreted as spam;
automatically inserting link information into the augmented electronic invite to the electronic social network application; and
transmitting at least a first portion of the augmented electronic invite comprising the inserted link information to the electronic social network application to the recipient's computing device over an electronic communications network, the transmitting of the augmented electronic invite enabling access, by the recipient using the recipient's computing device, to the augmented electronic invite and enabling access to the electronic social network application via the augmented electronic invite's link information.

6. The system of claim 5, wherein the processor further performs un-registering the recipient when it is determined that the recipient failed to select the link information.

7. The system of claim 5, wherein the first portion of the augmented electronic invite further comprises a link to another portion of the augmented electronic invite, and wherein the augmented invite component further performs:
receiving information about a computing device associated with the recipient based, in part, on transmitting of the first portion, the first portion of the augmented electronic invite further comprising a link to another portion of the augmented electronic invite; and
employing the information about the computing device to dynamically reconfigure the link information to be associated with a version of the electronic social network application useable by the computing device.

8. The system of claim 5, wherein automatically augmenting the electronic invite further comprises including shareable electronic social networking information that comprises at least one of a representation of other members of the member's social network, a representation of other members of the member's social network that are also known to be in the recipient's social network, information about the member, information about the recipient, a location of the member and the recipient, or information about the recipient known to the member.

9. The system of claim 5, wherein transmitting at least the first portion further comprises transmitting the first portion using a first communication mechanism and transmitting another portion using a different communication mechanism.

10. The system of claim 5, wherein automatically spoofing a source identifier further comprises automatically replacing a short code with an identifier associated with the member, including at least one of a name, a network address, or an alias.

11. A non-transitory storage device storing computer-readable instructions that when executed cause at least one processor to perform actions comprising:
transmitting, over an electronic communications network, a user interface to a computing device of a member of the electronic social network application, the transmitting causing the user interface to be displayed on a display at the member's computing device and enabling the member of the electronic social network application to generate an electronic invite to a recipient to participate in the electronic social network application;
receiving an identifier of the recipient from the member via the user interface and the electronic communications network;
registering the recipient that enables access to the digital object prior to transmitting an electronic invite to the recipient to participate in the electronic social networking application;
automatically augmenting an electronic invite with personally identifying information pertaining to the recipient to minimize a likelihood that the augmented electronic invite is interpreted as spam, the identifying information comprising at least one item of information about at least one of the member and the recipient known only by a limited group of people prior to the electronic invite being generated, the limited group of people including the recipient and the member associated with the augmented electronic invite, wherein the identifying information known only by a limited group of people prior to the electronic invite being generated is known from prior social interactions of the recipient and the member;
automatically spoofing a source identifier of the augmented electronic invite to make the augmented electronic invite appear to be originating from the member rather than from the augmented invite component, the spoofing being directed towards minimizing the likelihood that the augmented electronic invite is interpreted as spam;
automatically inserting link information into the augmented electronic invite to the digital object; and
transmitting at least a first portion of the augmented electronic invite comprising the inserted link information to the electronic social network application to the recipient's computing device over the electronic communications network, the transmitting of the augmented electronic invite enabling access, by the recipient using the recipient's computing device, to the augmented electronic invite and enabling access to the electronic social network application via the augmented electronic invite's link information.

12. The non-transitory storage device of claim 11, the digital object further comprises at least one of a shareable electronic social network application, a photograph, an audio file, a profile, an address book, a buddy list, game data, or a video file.

13. The non-transitory storage device of claim 11, the actions further comprising:
receiving information about a computing device associated with the recipient based, in part, on transmitting of the first portion; and
employing the information about the computing device to dynamically reconfigure the linked information to be associated with at least a portion of a version of the digital object immediately usable by the computing device.

14. The non-transitory storage device of claim 11, the actions further comprising un-registering the recipient when it is determined that the recipient failed to select the link information.

15. The non-transitory storage device of claim 11, the digital object is configured to enable the recipient to register another recipient as a member enabled to access the digital object.

16. A network device comprising:
a transceiver configured to send and receive data over an electronic communication network;
a processor; and
a non-transitory storage medium storing instructions for execution by the processor to perform actions, including:
transmitting, over an electronic communications network, a user interface to a computing device of a member of the electronic social network application, the transmitting causing the user interface to be displayed on a display at the member's computing device and enabling the member of the electronic social network application to generate an electronic invite to a recipient to participate in the electronic social network application;
receiving, from the member of the electronic social networking application, an identifier of the recipient from the member via the user interface and the electronic communications network;
automatically registering the recipient to the electronic social network application prior to the electronic invite being sent to the recipient;
automatically augmenting the electronic invite with personally identifying information pertaining to the recipient to minimize the likelihood that the augmented electronic invite is interpreted as spam, the identifying information comprising at least one item of information about at least one of the member and the recipient known only by a limited group of people prior to the electronic invite being generated, the limited group of people including the recipient and the member associated with the augmented electronic invite, wherein the identifying information known only by a limited group of people prior to the electronic invite being generated is known from prior social interactions of the recipient and the member;
automatically spoofing an internet protocol source identifier of the augmented electronic invite to make the augmented electronic invite appear to be originating from the member rather than from the network device, the spoofing is performed in a manner that minimizes the likelihood that the augmented electronic invite is interpreted as spam;
automatically inserting link information into the augmented electronic invite to the electronic social network application; and
transmitting at least a first portion of the augmented electronic invite comprising the inserted link information to the electronic social network application to the recipient's computing device over the electronic communications network, the transmitting of the augmented electronic invite enabling access, by the recipient using the recipient's computing device, to the augmented electronic invite and enabling access to the electronic social network application via the augmented electronic invite's link information.

17. The network device of claim 16, wherein the processor further performs:
   un-registering the recipient when it is determined that the recipient failed to select the link information.

18. The network device of claim 16, wherein the processor further performs:
   receiving information about a mobile device associated with the recipient based, in part, on transmitting of the first portion; and
   employing the information about the mobile device, to dynamically reconfigure the link information to be associated with at least a portion of a version of the digital object immediately useable by the mobile device.

19. The network device of claim 16, wherein the processor further performs including shareable social networking information that comprises at least one of a current location of the member, a current location of the recipient, information about the member's interests, or information about the recipient's interest.

20. A non-transitory storage device for storing thereon computer-readable instructions that when executed cause at least a processor to perform actions comprising:
   providing a selectable user interface that enables a member of an electronic social network application to generate an electronic invite to the electronic social network application;
   receiving an identifier of the recipient of the electronic invite;
   automatically augmenting the electronic invite with personally identifying information pertaining to the recipient, the identifying information comprising at least one item of information known only by a limited group of people prior to the electronic invite being generated, the limited group of people including the recipient and the member associated with the augmented electronic invite, wherein the identifying information is known from prior social interactions of the recipient and the member;
   automatically spoofing a source identifier of the augmented electronic invite to make the augmented electronic invite appear to be originating from the member rather than from a server device, the spoofing being implemented to minimize a likelihood that the augmented electronic invite is interpreted as spam;
   transmit a first portion of the augmented electronic invite to the recipient;
   receive a request from the recipient to access another portion of the augmented electronic invite;
   determine a capability of a computing device associated with the request; and
   transmit a second portion of the augmented electronic invite to the recipient with link information to a version of the electronic social networking application configured to be compatible with the capability of the computing device.

* * * * *